United States Patent
Baudoin et al.

(10) Patent No.: US 9,787,392 B2
(45) Date of Patent: Oct. 10, 2017

(54) SATELLITE COMMUNICATIONS NETWORKING

(71) Applicant: IRIDIUM SATELLITE LLC, McLean, VA (US)

(72) Inventors: Cedric Baudoin, Toulouse (FR); Jean-Francois Boutillon, Cugnaux (FR)

(73) Assignee: IRIDIUM SATELLITE LLC, McLean, VA (US)

( * ) Notice: Subject to any disclaimer, the term of this patent is extended or adjusted under 35 U.S.C. 154(b) by 62 days.

(21) Appl. No.: 14/855,998

(22) Filed: Sep. 16, 2015

(65) Prior Publication Data

US 2016/0080072 A1   Mar. 17, 2016

(30) Foreign Application Priority Data

Sep. 17, 2014 (EP) .................................... 14290278

(51) Int. Cl.
*H04B 7/185* (2006.01)
*H04W 40/02* (2009.01)
*H04W 40/14* (2009.01)

(52) U.S. Cl.
CPC ..... *H04B 7/18584* (2013.01); *H04B 7/18519* (2013.01); *H04B 7/18521* (2013.01); *H04B 7/18586* (2013.01); *H04W 40/023* (2013.01); *H04W 40/14* (2013.01)

(58) Field of Classification Search
None
See application file for complete search history.

(56) References Cited

U.S. PATENT DOCUMENTS

| 6,178,163 | B1 * | 1/2001 | Yuan | H04B 7/18584 370/323 |
| 9,094,856 | B1 * | 7/2015 | Tian | H04B 7/18513 |
| 2002/0150060 | A1 * | 10/2002 | Montpetit | H04L 69/22 370/316 |

FOREIGN PATENT DOCUMENTS

WO   2012-047880 A2   4/2012

OTHER PUBLICATIONS

European Patent Office, extended European Search Report for European Patent Application No. 14290278.2, dated Mar. 9, 2015.
J. Stepanek et al., "Fault-Tolerant Routing for Satellite Command and Control", 2004 IEEE Aerospace Conference Proceedings, Mar. 6, 2004, pp. 1671-1676, XP010748285.

(Continued)

*Primary Examiner* — Min Jung
(74) *Attorney, Agent, or Firm* — Baker Botts LLP (57) ABSTRACT

A method of operating a satellite communication network is disclosed. The network includes a plurality of satellites interconnected by a plurality of satellite-to-satellite communication links. Each of the plurality of satellites is configured to communicate with at least one ground station using respective ground-satellite communication links. The method includes transmitting a routing table to each of the satellites. Each routing table has a list of destination satellites, and defines at least two possible routes leading to it. An alert message identifying a problem communication link is transmitted to a subset of the plurality of satellites. In response to receiving the alert message, subsequent data packets are routed through the communication network by the satellites using their respective routing table to avoid the problem communication link.

19 Claims, 3 Drawing Sheets

(56) References Cited

OTHER PUBLICATIONS

T. Taleb et al., "Explicit Load Balancing Technique for NGEO Satellite IP Networks with On-Board Processing Capabilities", IEEE/ACM Transactions on Networking, vol. 17, No. 1, Feb. 2009, pp. 281-293, XP011246763.

* cited by examiner

SATELLITE COMMUNICATIONS NETWORKING

BACKGROUND

The disclosure relates to satellite communications networking.

SUMMARY

A method of operating a satellite communication network having a plurality of satellites interconnected by a plurality of satellite-to-satellite communication links, each of the plurality of satellites being configured to communicate with at least one of a plurality of ground stations using respective ground-satellite communication links, comprises:

transmitting, using the respective ground-satellite communication links, at least one respective routing table to each of the plurality of satellites, each routing table comprising a list of destination satellites of the plurality of satellites and, for each particular destination satellite, definitions of at least two possible routes leading to it, the definition of a route comprising an ordered list of interconnected ones of the plurality of satellites linking a source satellite of the plurality of satellites to the particular destination satellite;

detecting a problem communication link at a particular one of the plurality of satellites, the problem communication link comprising either a problem with the particular one of the plurality of satellites' ability to communicate with one of the plurality of ground stations using one of the plurality of ground-satellite communication links, or a problem with the particular satellite's ability to communicate with others of the plurality of satellites using one of the satellite-to-satellite communication links;

transmitting, from the particular one of the plurality of satellites, an alert message (AM) to at least a subset of the plurality of satellites, the alert message identifying the problem communication link as problematic; and in response to receiving the alert message, routing, by the subset of the plurality of satellites, subsequent data packets through the communication network using their respective at least one routing table to avoid the problem communication link.

In an alternative embodiment, a component of a satellite configured for incorporation within a satellite communications network having a plurality of satellites interconnected by a plurality of satellite-to-satellite communication links, each of the plurality of satellites being configured to communicate with at least one of a plurality of ground stations using respective ground-satellite communication links, includes logic elements configured to:

store a data structure that identifies different possible destinations in the satellite communications network and defines, for each of multiple of the identified destinations, multiple different routes for routing data from the satellite to the destination;

receive an indication of a problem in the satellite communications network;

determine that the problem in the satellite communications network impacts a first one of the routes defined in the data structure for routing data from the satellite to a particular destination;

update the data structure to reflect that the first route for routing data from the satellite to the destination has been impacted by a problem;

receive data to be routed from the satellite to the particular destination in the satellite communications network;

access the data structure;

determine, based on accessing the data structure, that the first route for routing data from the satellite to the particular destination has been impacted by a problem; and in response to determining that the first route for routing data from the satellite to the particular destination has been impacted by a problem, select a second route for routing data from the satellite to the particular destination from the different routes for routing data from the satellite to the destination defined in the data structure.

Particular aspects of such a method, such a satellite communications network, and such a satellite component comprise the subject-matter of the dependent claims. Implementations described herein, including the above-described implementations, may include a method or process, a system, or computer-readable program code embodied on computer-readable media.

Additional features will become apparent from the subsequent description, taken in conjunction with the accompanying drawings.

DETAILED DESCRIPTION

In one example, a satellite communication network includes a constellation of satellites (e.g., a constellation of non-geostationary satellites like a constellation of low earth orbit (LEO) (e.g., 160-2,000 km above the Earth's surface) satellites) interconnected by satellite-to-satellite communication links. One example of such a satellite communications network is the current Iridium® constellation. Another example of such a satellite communications network is the Iridium NEXT constellation currently under development.

Figure 1:
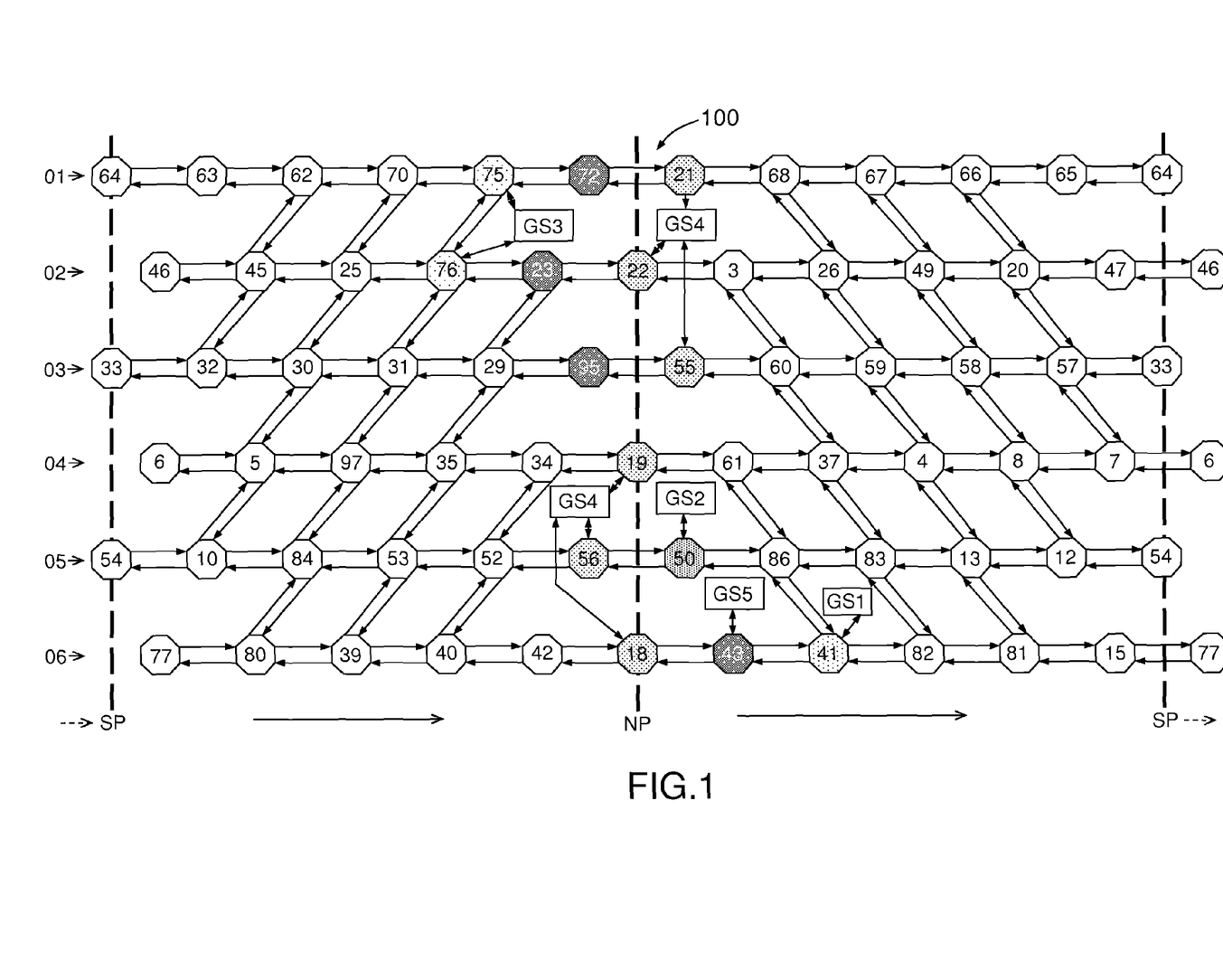
FIG. 1 is a schematic diagram of an example of a satellite communications network.

FIG. 1 illustrates, schematically, the topology of an example of a satellite network 100 (e.g., a constellation of non-geostationary satellites in LEO). As illustrated in FIG. 1, this network comprises 66 satellites (referenced 3, 4, 5, 6, 8, 7, 10, 12, 13, 15, 18, 19, 20, 21, 22, 23, 25, 26, 29, 30, 31, 32, 33, 34, 35, 37, 39, 40, 41, 42, 43, 45, 46, 47, 49, 50, 52, 53, 54, 55, 56, 57, 58, 59, 60, 61, 62, 63, 64, 65, 66, 67, 68, 70, 72, 75, 76, 77, 80, 81, 82, 83, 84, 86, 95, 97), 11 on each one of 6 orbital planes O1-O6, the orbital planes being spaced approximately 30 degrees apart. As illustrated, the orbits are nearly polar (e.g., the orbits have an inclination of approximately 86.4°) and are substantially circular (e.g., at a height of approximately 781 km above the earth). In some implementations, the orbital period may be about (or on the order of) 100 minutes.

Individual satellites communicate with neighboring satellites via satellite-to-satellite communication links ("crosslinks"). As illustrated in FIG. 1, an individual satellite may be cross-linked to four neighboring satellites: two to neighbors fore and aft in the same orbital plane and two to satellites in neighboring planes to either side. In some implementations, the cross-links may be implemented in the $K_a$ frequency band. As illustrated in FIG. 1, in some implementations, near the North Pole NP and the South Pole SP, there may be no cross-links between satellites in adjacent planes. Moreover, although orbital planes O1 and O6 are adjacent, their satellites orbit in opposite directions. Therefore, in some implementations, there may be no cross-links between the satellites in orbital planes O1 and O6.

As illustrated in FIG. 1, the satellite communications network also includes 5 ground stations: GS1 (e.g., situated in Hawaii (USA)), GS2 (e.g., situated at Fairbanks (Alaska, USA)), GS3 (e.g., situated in Tempe (Arizona, USA)), GS4 (e.g., situated in Svalbard (Norway)), and GS5 (e.g., situated in Yellowknife (Northwest Territories, Canada)). At any given time, one or more satellites may be connected to one or more ground stations (e.g., by feeder link(s)). For example, as illustrated in FIG. 1, satellite 41 is connected to GS1, satellite 50 is connected to GS2, satellites 75 and 76 are connected to GS3, satellites 21, 22, 55, 19, 56 and 18 are connected to GS4, and satellites 72, 23, 95 and 43 are connected to GS5. In some implementations, feeder links between satellites and ground stations may be implemented in the K frequency band.

Additional terrestrial terminals (e.g., mobile satellite terminals like satellite telephones and other mobile satellite communications devices) may be used in addition to or in lieu of ground stations, and may establish connections with one or more of the satellites, for example, for the purpose of routing communications from the terrestrial terminals to other terrestrial destinations and/or vice versa via the satellite communications network (and, in some cases, one or more other networks (e.g., the public switched telephone network (PSTN), the Internet, etc.)). In some implementations, such connections between satellites and terrestrial mobile satellite terminals may be implemented in the L frequency band.

FIG. 1 illustrates the network topology at a given point in time. However, the topology changes over time due to the movements of the satellites along their orbits and/or the rotation of the earth. For example, a few minutes after the point in time illustrated in FIG. 1, the cross-link between satellites 20 and 57 may be broken (e.g., as satellites 20 and 57 near the south pole), while a cross-link between satellites 33 and 46 may be established (e.g., as satellites 33 and 46 move away from the south pole), satellite 29 may establish a connection with GS5 (e.g., as satellite 29 nears the north pole and the earth rotates), satellite 43 may break its connection with GS5 and establish a new connection with GS4, and satellite 55 no longer may be connected to a ground station.

As illustrated in FIG. 1, the satellites and ground stations represent nodes of the satellite communications network. Data (e.g., packets), representing e.g. phone calls or other communications, may be routed between satellites and/or one or more ground stations in order for the data to be transmitted from its origin (e.g., a mobile satellite terminal) to its intended destination (e.g., a ground station for routing to a terrestrial terminal via another network like the PSTN or the Internet).

The satellite network 100 may employ various different techniques to handle problems (e.g., failure and/or congestion) with the cross-links between individual satellites. For example, in the event that a satellite detects a problem (e.g., failure or congestion) with a cross-link that it intended to use to transmit data to another satellite, the satellite may use another of its cross-links to transmit the data to a different satellite to enable the data to progress toward its ultimate destination. This technique may be referred to as local rerouting and an example is illustrated in FIG. 2.

Figure 2:
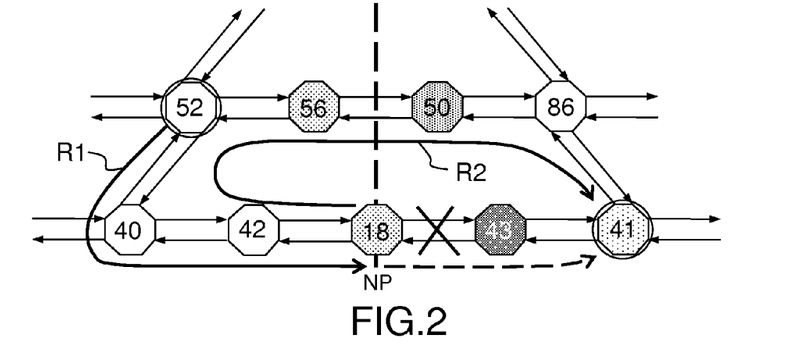
FIGS. 2 and 3 are schematic diagrams of a portion of a satellite communications network that illustrate techniques for routing a data packet in the satellite communications network.

As illustrated in FIG. 2, reference R1 identifies a route determined for a packet to traverse to reach satellite 41 from satellite 52. The packet follows route R1 until it reaches satellite 18. However, as illustrated in FIG. 2, satellite 18 has detected that its cross-link with satellite 42 is experiencing a problem (e.g., failure and/or congestion). Therefore, route R1 is interrupted and a new route is determined to route the packet to satellite 41. In particular, satellite 18 redirects the packet along route R2, allowing it to eventually reach its destination of satellite 41. When such local rerouting is performed, to prevent the packet from being routed back to satellite 18, a "no u-turn" function may be implemented. However, this function can be defeated by a failed link (e.g., if the cross-link between satellites 42 and 40 experiences a problem). Furthermore, the local rerouting solution may lead to sub-optimal routing, and, in some cases, even to deadlocks. Moreover, local rerouting may not allow for efficient and/or effective congestion management.

The techniques described herein may mitigate the above-mentioned drawbacks of the local rerouting technique, potentially allowing for more efficient management of problematic cross-links (e.g., failed and/or congested cross-links) in a satellite communications network.

For example, cross-link problems (e.g., failure and/or congestion) in a satellite communications system may be addressed using routing tables that contain full descriptions of multiple routes between different source—destination satellite pairs (e.g., multiple routes between each possible source—destination satellite pair in the satellite communications network) and alert messages transmitted by satellites (or other nodes) experiencing problems (e.g., failure and/or congestion) with at least one of their cross-links.

In some implementations, each satellite receives, from a ground station (either directly or indirectly via one or more other satellites), a routing table that includes complete descriptions of a plurality of different routes linking it to all (or some subset of all of) the other satellites of the network. In other implementations, only some subset of the satellites may receive routing tables that include complete descriptions of pluralities of different routes linking them to all (or some subset of all of) the other satellites of the network. A "complete description" of a route may be, for example, an ordered list of nodes (e.g., satellites) forming the route. The routing table(s) distributed to the satellites may original from a terrestrial operations center.

In some implementations, there may be a hierarchical order between the routes linking a "source" satellite to a "destination" satellite. For example, one route may be designated as the "primary" route and be intended to be used as the default route; meanwhile, other routes may be designated as "backup" routes to be used in the event that one of the satellite-to-satellite links of the primary route experiences a problem (e.g., failure or congestion). Such backup routes also may have a hierarchical ordering defining the order in which they are to be used in the event of problems with cross-links in the different backup routes.

Figure 3:
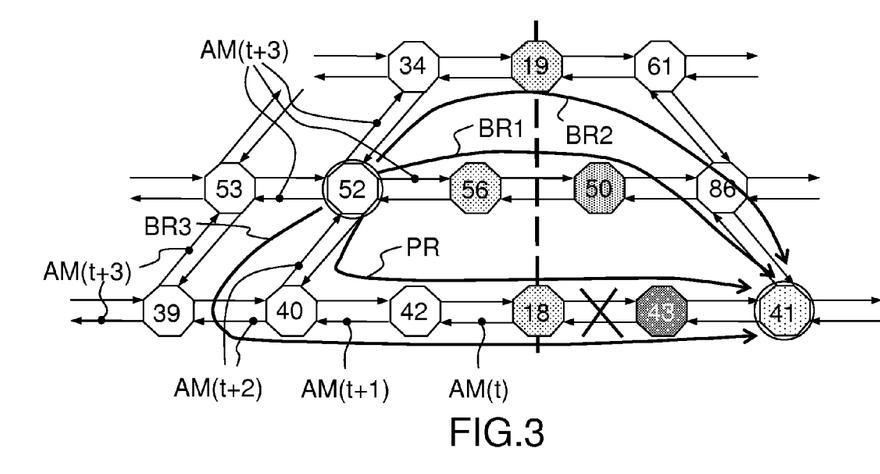

An example is illustrated in FIG. 3. As illustrated in FIG. 3, a primary route PR and three backup routes BR1, BR2 and BR3 have been defined between satellite 52 and 41. The following Table 1 represents a portion of one example of a routing table for satellite 52 that shows examples of descriptions of these different routes linking satellite 52 to satellite 41:

TABLE 1

| Destination satellite | Route | Description | Status |
|---|---|---|---|
| 41 | | | |
| | PR | 40 - 42 - 18 - 43 | I |
| | BR1 | 56 - 50 - 86 | A |
| | BR2 | 34 - 19 - 61 - 86 | A |
| | BR3 | 53 - 39 - 40 - 42 - 18 - 43 | I |

As illustrated in Table 1, the routing table for satellite 52 instructs satellite 52 to route a data packet destined for satellite 41 along the primary route PR, extending through satellites 40, 42, 18 and 43, unless there is a problem (e.g., failure and/or congestion) with a cross-link within the primary route PR. Such a problem is illustrated in FIG. 3, where there is a problem (e.g., failure and/or congestion) with the cross-link between satellites 18 and 43. As described in greater detail below, satellite 52 will have received prior notification of this the problem impacting the cross-link between satellites 18 and 43 and, therefore, satellite 52 will choose to route the packet to satellite 41 using the first backup route BR1 instead of the primary route PR. In the event that backup route BR1 also is experiencing a problem with a cross-link, satellite 52 would use BR2 to route the packet to satellite 41 instead and so on.

In some implementations, the routing table for a satellite may include at least two routes for routing data from the satellite to a destination satellite that do not have any (or that have no more than some predefined number of) intermediary satellites in common.

In the example illustrated in Table 1, each route between satellite 52 and 41 is characterized by a "status", which is illustrated in this example as taking one of two values: Inactive (I) (e.g., where one or more of the cross-links in the route are known to be experiencing a problem) or Active (A) (e.g., where none of the cross-links in the route are known to be experiencing a problem); this will be explained in greater detail below. In alternative implementations, the "status" may take one of three values: Active, Inactive (i.e. failed) and Congested. Such an approach may allow the satellites to route data differently depending on whether problems with cross-links are due to failures or congestion.

It should be noted that the routes linking satellite 41, when it is the source node, to satellite 52, when it is the destination node, may be the same as the routes linking satellite 52 to satellite 41 (albeit with satellites encountered in the reverse order) or different, depending on the particular implementation.

In one particular example of a satellite communications network, there are 66 satellites and each one uses a distinct routing table to route data through the satellite communications network, where each routing table comprises N>1 routes for each of the 65 possible destination satellites, plus the ground stations. In an example where N=4 (e.g., where there is a primary route and three backup routes for each source—destination satellite pair), a route comprises on average 10 satellites (which may be more than the actual value), each satellite of the route is represented by a byte, and an additional byte is used to code the state of each route and, for the sake of simplicity, routes having a ground station as their destination are ignored, the set of all of the routing tables for a given topology may be represented in 66×65× (10+1) bytes, i.e. slightly more than 46 Kbytes.

In some implementations, the routing tables are transmitted to the satellites by the ground station(s), and the status of all of the routes in any given routing table may be set to "Active" by default. Depending upon the implementation, the routing table used by an individual satellite may be updated at each change of the network topology (which, e.g., may be due to the movement of the satellites along their orbits). Each routing table may be applicable during one or more predetermined active periods (e.g., periods during which the routing table corresponds to the current topology of the satellite communications network). In some implementations, several routing tables are uploaded to individual satellites in advance of their active periods, e.g. several days before. In such implementations, the individual satellites may update their active routing tables themselves, and the synchronization of this updating may be achieved automatically. A ground station may upload routing tables to a satellite when the satellite is connected to the ground station, or routing tables may be routed from the ground station to the satellite across the satellite communications network (e.g., using the routing table(s) of the relevant satellite(s) which are active at the time of the upload) if the satellite is not connected to the ground station.

In order to enable individual satellites to make intelligent choices about which routes listed in their routing tables to use to route data to particular destinations, some or all of the satellites are made aware of known problems (e.g., failures and/or congestion) in the satellite communications network. For example, a satellite experiencing a cross-link failure and/or congestion may initiate an alert (e.g., an alert packet) identifying the problem and/or its location which is transmitted to some or all of the other satellites. In some implementations, conventional flooding algorithms may be used to ensure distribution of the alert to all of the satellites via the satellite-to-satellite links. Such techniques may converge quickly due to the moderate size of a typical satellite communications network.

Various different techniques may be employed to detect a problem in the satellite communications network. For example, an individual satellite may have one or more modems and use the modem(s) to detect problems with its cross-links. In such implementations, the modem on a satellite can detect the failure of one of its cross-links by, for example, monitoring its synchronization state. If the modem detects that the cross-link is synchronized, the modem may determine that the cross-link is functional. In contrast, if the modem detects that the cross-link is not synchronized, the modem may determine that the cross-link has failed. Moreover, a satellite can determine that one of its cross-links is congested, for example, by comparing the known capacity of the cross-link to the current traffic on the cross-link. The described techniques for detecting problems (e.g., cross-link failure and/or congestion) in the satellite communications network are non-exhaustive examples. Other techniques may be employed for detecting problems (e.g., cross-link failure and/or congestion) in the satellite communications network.

Referring again to the example illustrated in FIG. 3, when satellite 18 determines or otherwise becomes aware that there is a problem (e.g., failure and/or congestion) with its cross-link to satellite 43, it generates an alert message AM indicating "link 18-43 interrupted" and initiates the distribution of the alert message through the satellite communications network by sending it through its remaining cross-links (in the example considered here, the cross-link with satellite 42 is its only remaining cross-link). As illustrated in FIG. 3, that alert message AM emitted by satellite 18 may reach satellite 42 at time "t", then satellite 40 at time "t+1", satellites 39 and 52 at time "t+2", satellites 34, 53, 56 and 80 at time "t+3" and so on. In some implementations, satellite 43 also may detect the problem with the cross-link and send a similar (or the same) alert message.

When an individual satellite in the satellite communications network receives the alert message AM, it may change the status of all the routes in its active routing table that include the cross-link between satellites 18 and 14 to "Inactive", for example, as illustrated in Table 1.

Other implementations are possible. For instance, each satellite could store a list of problematic (e.g., failed and/or congested) links and use the list to determine, on the fly, the highest-priority active route to a destination when the satellite needs to transmit data to the destination. Additionally or alternatively, in some implementations, when a cross-link is experiencing congestion, already-established, active connections may be allowed to continue to use the congested cross-link, but new connections may be discouraged (or prevented) from using the cross-link by using backup routes that utilize different cross-links instead. Such an approach may allow for a progressive de-congestion of the congested cross-link.

In some implementations, if a problem in the satellite communications network (e.g., the failure of the cross-link between satellites 18 and 43 illustrated in FIG. 3) is resolved, one or more satellites that detect or otherwise become aware of the resolution (e.g., satellites 18 and 43) may distribute "end-of-alert" messages, for example, using the same mechanism(s) used to distribute the original alert message, and satellites that receive such "end-of-alert" messages may change the status of implicated routes from "Inactive" or "Congested" to "Active" (or withdraw the 18-43 link from their list of failed/congested links).

In situations where the problem with a problematic cross-link is congestion, it may be advantageous to implement a mechanism to avoid rapid oscillations between statuses of problematic and non-problematic. For example, a non-congested cross-link may be determined to become congested when the traffic on the cross-link exceeds a first threshold T1 while a congested cross-link may be determined to become non-congested when the traffic on the cross-link decreases below a second threshold T2, where T2<T1.

In some implementations, Quality-of-Service (QoS) levels associated with different types of traffic carried across the satellite communications network may be used in determining how to route different traffic in the satellite communications network, particularly in the case of congestion on one or more cross-links. For example, in one implementation, traffic may be assigned to one of four different QoS levels, QoS1, QoS2, QoS3, and QoS4, where QoS1 traffic is to be given priority over QoS2, QoS3, and QoS4 traffic, QoS2 traffic is to be given priority over QoS3 and QoS4 traffic, and so on. In such implementations, when different QoS level traffic is being considered for routing over a congested cross-link, higher priority QoS level traffic may be routed over the congested cross-link before lower priority QoS level traffic. For example, if the traffic being routed over a cross-link causes the traffic on the cross-link to exceed a threshold level of congestion, the link may be determined to be congested and routed away from the cross-link for the lowest priority QoS level of traffic currently being routed over the cross-link and each successive higher priority QoS level of traffic until the traffic being routed across the cross-link falls below an uncongested traffic level.

Figure 4A:
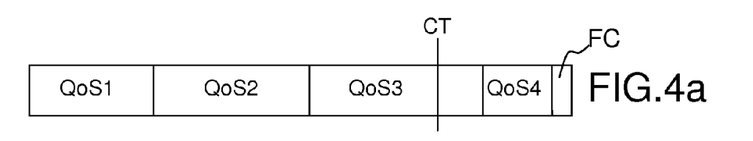
FIGS. 4a and 4b are schematic diagrams that illustrate traffic levels in a satellite-to-satellite communication link.
Figure 4B:
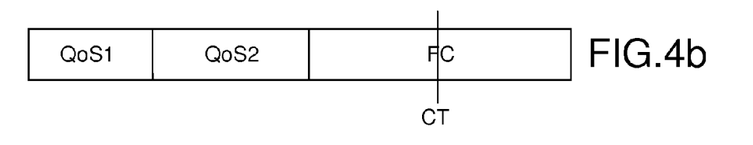

FIGS. 4a and 4b illustrate one example. Referring first to FIG. 4a, FIG. 4a illustrates the current traffic load across the 18-43 satellite pair cross-link in a case where four different QoS levels—QoS1 to QoS4—are present. FC represents the free capacity of the link. As illustrated in FIG. 4, the sum of the QoS1 and QoS2 traffic does not exceed the congestion threshold CT, but, when the QoS3 and QoS4 traffic are considered, the traffic across the cross-link exceeds the congestion threshold CT. As a result, one or both of satellites 18 and 43 may determine that the cross-link is congested for QoS3 and QoS4 traffic and transmit an alert message indicating "link 18-43 congested for QoS3 and QoS4" for distribution through the satellite communications network. Consequently, satellites that receive this alert message may consider routes that include the 18-43 satellite pair cross-link to be "Active" for QoS1 and QoS2 traffic but "Inactive" for QoS3 and QoS4 traffic. This may eliminate (or at least reduce) the congestion of the cross-link, for example, as illustrated in FIG. 4b, thereby potentially providing better Quality-of-Service to the higher priority QoS1 and QoS2 traffic than the QoS3 and QoS4 traffic. Alternatively, in some implementations, all QoS4 traffic may be rerouted away from the 18-43 satellite pair cross-link while only a portion of the QoS3 traffic is rerouted.

Figure 5:
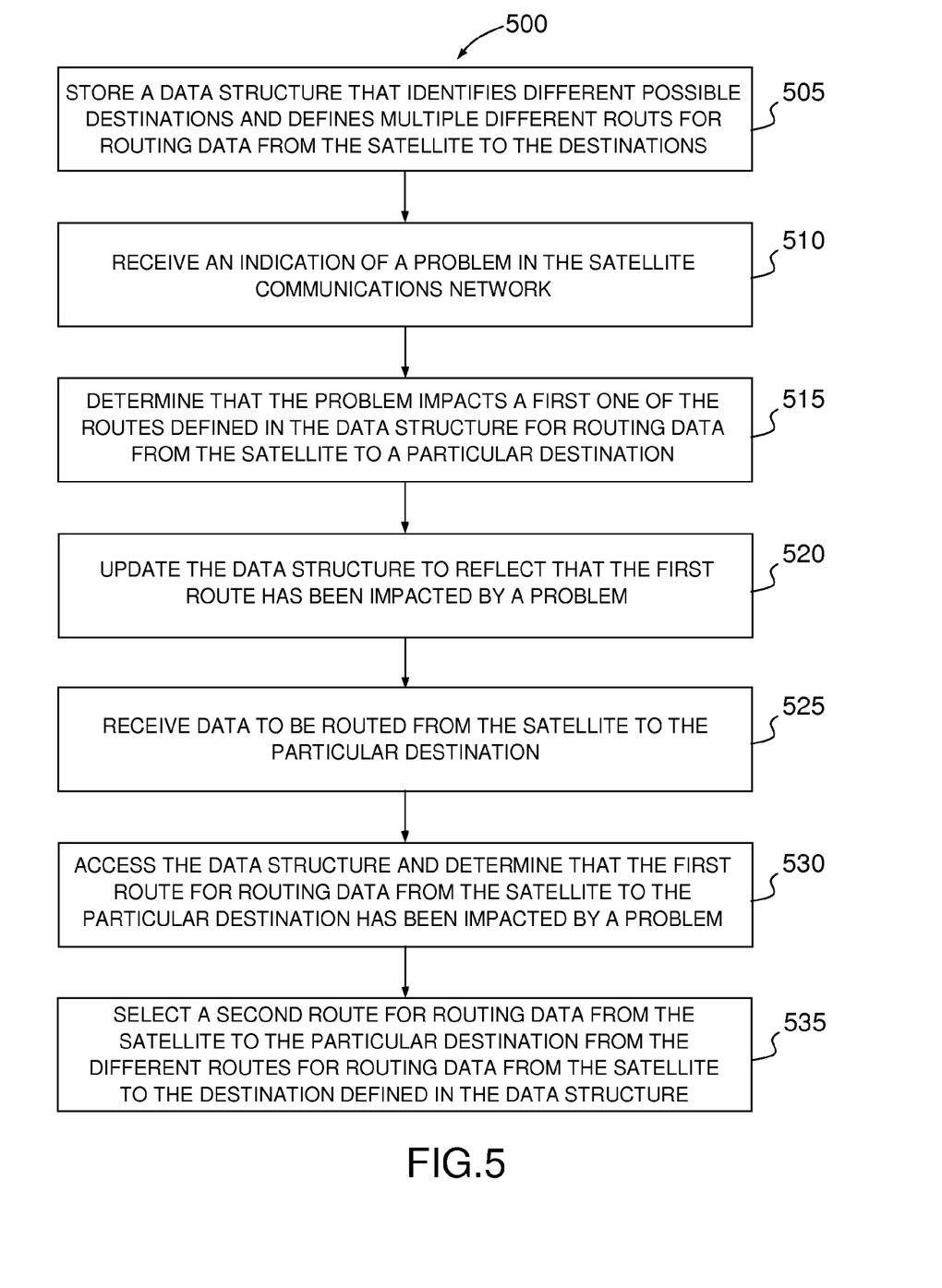
FIG. 5 is a flowchart that illustrates a process of determining a route for routing data in a satellite communications network.

FIG. 5 is a flowchart that illustrates a process 500 of determining a route for routing data in a satellite communications network (e.g., a satellite communications network that includes multiple satellites that are interconnected by satellite-to-satellite communication links, such as, for example, the example satellite communications networks described above). The process 500 may be performed by a satellite, or a component of a satellite, in the satellite communications network. For example, the satellite, or the component of the satellite, may include one or more logic elements (e.g., one or more processors, field programmable gate arrays (FPGAs), and the like) that are configured to perform the process.

As illustrated in FIG. 5, a data structure (e.g., a routing table) that identifies different possible destinations (e.g., other satellites and/or ground stations) and defines multiple different routes for routing data from the satellite to the destinations is stored (505). For example, the data structure may be stored in a computer-readable storage medium on board the satellite.

At some point, an indication of a problem in the satellite network (e.g., a failure of and/or congestion in a cross-link) is received (510). For example, as described above, another satellite in the satellite communications network may detect a problem and transmit an alert message identifying the problem to other satellites in the satellite communications network. After the indication of the problem has been received, a determination is made that the problem impacts a first one of the routes defined in the data structure for routing data from the satellite to a particular destination (e.g., a particular satellite or ground station) (515). As a consequence of determining that the problem impacts the first route from the satellite to the particular destination, the data structure is updated to reflect that the first route has been impacted by the problem (520). For example, the data structure may be updated to reflect that a failure has occurred in the first route and/or that the first route is congested.

Thereafter, data to be routed from the satellite to the particular destination is received (525). In response to receiving the data to be routed from the satellite to the particular destination, the data structure is accessed and a determination is made that the first route for routing data from the satellite to the particular destination has been impacted by a problem (530). For example, a determination may be made that a failure has occurred in the first route and/or that the first route is congested. As a consequence of having determined that the first route has been impacted by a problem, a second route for routing data from the satellite to the particular destination is selected from the different routes for routing data from the satellite to the destination that are defined in the data structure (535). The data then may be routed (e.g., transmitted) to another satellite according to the selected route.

Aspects of the present disclosure may be implemented entirely in hardware, entirely in software (including firmware, resident software, micro-code, etc.) or in combinations of software and hardware that may all generally be referred to herein as a "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The figures illustrate examples of possible implementations according to various aspects of the present disclosure. In this regard, each block in a flowchart may represent a module, segment, or portion of code, which comprises one or more executable instructions for implementing the specified logical function(s). It should also be noted that, in some alternative implementations, the functions noted in the block may occur out of the order illustrated in a figure. For example, two blocks shown in succession may, in fact, be executed substantially concurrently, or the blocks may sometimes be executed in the reverse order, depending upon the functionality involved. It will also be noted that each block of a flowchart, and combinations of blocks in a flowchart, can be implemented by special purpose hardware-based systems that perform the specified functions or acts, or combinations of special purpose hardware and computer instructions.

The description of the present disclosure has been presented for purposes of illustration and description, but is not intended to be exhaustive or limited to the disclosure in the form disclosed. Other implementations are possible. For instance, alert messages transmitted from at least some of the satellites can also be transmitted to one or more ground stations. Moreover, the ground stations can also detect problems and/or the resolution of problems in the satellite communications network and transmit alert and/or end-of-alert messages to other ground stations and/or to satellites in response. After all, both the satellites and the ground stations may be considered nodes of the satellite communications network and may be capable of performing some of the same functions, particularly when it comes to making decisions about how to route data in the satellite communications network.

What is claimed is:

1. A method of operating a satellite communication network having a plurality of satellites interconnected by a plurality of satellite-to-satellite communication links, comprising:

transmitting, using the respective ground-satellite communication links, at least one respective routing table to each of the plurality of satellites, each routing table comprising a list of destination satellites of the plurality of satellites and, for each particular destination satellite, definitions of at least two possible routes leading to it, the definition of a route comprising an ordered list of interconnected ones of the plurality of satellites linking a source satellite of the plurality of satellites to the particular destination satellite;

detecting a problem communication link at a particular one of the plurality of satellites, the problem communication link comprising either a problem with the particular one of the plurality of satellites' ability to communicate with one of a plurality of ground stations using one of a plurality of ground-satellite communication links, or a problem with the particular satellite's ability to communicate with others of the plurality of satellites using one of the satellite-to-satellite communication links;

transmitting, from the particular one of the plurality of satellites, an alert message (AM) to at least a subset of the plurality of satellites, the alert message identifying the problem communication link as problematic; and in response to receiving the alert message, routing, by the subset of the plurality of satellites, subsequent data packets through the communication network using their respective at least one routing table to avoid the problem communication link.

2. The method of claim 1, wherein the problem communication link comprises a problem with the particular one of the plurality of satellites' ability to communicate with one of the plurality of ground stations using one of the plurality of ground-satellite communication links, and further comprising transmitting, from the one of the plurality of ground stations a second alert message identifying the problem communication link as problematic, to at least some of the plurality of satellites and others of the plurality of ground stations.

3. The method of claim 1, wherein each respective routing table comprises, for each of the destination satellites, a primary route and at least one backup route, said backup route being used if at least one satellite-to-satellite communication link of the primary route comprises the problem communication link.

4. The method of claim 3, wherein each data packet of a plurality of data packets belong to one of multiple different Quality-of-Service classes and further comprising, when at least one communication link of the primary route for a data packet comprises the problem communication link, for each data packet of the subsequent data packets, determining whether to re-route the data packet based at least in part upon the Quality-of-Service class to which the data packet belongs.

5. The method of claim 1, wherein transmitting of the alert message is performed using a flooding algorithm.

6. The method of claim 1, wherein each routing table is applicable during a predetermined active period, and each routing table is transmitted to a respective satellite in advance of the predetermined active period.

7. A satellite communications network, comprising:
a plurality of satellites interconnected by a plurality of satellite-to-satellite communication links, each of the plurality of satellites being configured to communicate with at least one of a plurality of ground stations using respective ground-satellite communication links;
said at least one of a plurality of ground stations being configured for transmitting at least one respective routing table to each of a subset of said satellites, each routing table comprising a list of destination satellites of the plurality of satellites and, for each individual destination satellite, definitions of at least two possible routes leading to it, the definition of a route comprising an ordered list of interconnected satellites of the plurality of satellites, linking a source satellite of the plurality of satellites to the destination satellite;
each particular one of the plurality of satellites being configured to:
detect a problem communication link, the problem communication link comprising either a problem with the particular one of the plurality of satellites' ability to communicate with one of the plurality of ground stations using one of the plurality of ground-satellite communication links, or a problem with the particular satellite's ability to communicate with others of the plurality of satellites using one of the satellite-to-satellite communication links; and
send an alert message to at least some of the other satellites, said alert message identifying said problem communication link as problematic; and
each of the at least some of the others of the plurality of satellites being configured to route subsequent data packets through said communication network using its routing table to avoid the problem communication link, in response to receiving the alert message.

8. A satellite communications network according to claim 7, wherein the at least one ground station is configured to determine whether the problem communication link comprises a communication link interconnecting it to a satellite or another ground station, and, in response, sending another alert message to at least some additional ones of the satellites and the other ground stations.

9. A satellite communications network according to claim 7, wherein said routing tables comprise, for each destination satellite, a primary route and at least one backup route, said backup route being used if at least one communication link of the primary route comprises the problem communication link.

10. A satellite communications network according to claim 9, wherein each data packet belongs to one of multiple different Quality-of-Service classes and wherein each said satellite is configured to, when routing a data packet after determining that at least one communication link of the primary route for said data packet comprises the problem communication link, determine whether to reroute said data packet along a backup route or not based at least in part on the Quality-of-Service class to which it belongs.

11. A satellite communications network according to claim 7, wherein said satellites are configured for transmitting said alert messages using a flooding algorithm.

12. A satellite communications network according to claim 7, wherein each said routing table is applicable during a predetermined active period, and said at least one said ground station is configured to transmit the respective routing table to a respective satellite in advance of said predetermined active period.

13. A satellite communications network according to claim 7, wherein said satellites move along a plurality of low earth orbit polar orbits.

14. A component of a satellite configured for incorporation within a satellite communications network having a plurality of satellites interconnected by a plurality of satellite-to-satellite communication links, said component comprising:
a processor;
computer readable media having executable computer instructions stored thereon, the executable computer instructions being operable, when executed by the processor, to:
store a data structure that identifies different possible destinations in the satellite communications network and defines, for each of multiple of the identified destinations, multiple different routes for routing data from the satellite to the destination;
receive an indication of a problem in the satellite communications network;
determine that the problem in the satellite communications network impacts a first one of the routes defined in the data structure for routing data from the satellite to a particular destination;
update the data structure to reflect that the first route for routing data from the satellite to the destination has been impacted by a problem;
receive data to be routed from the satellite to the particular destination in the satellite communications network;
access the data structure;
determine, based on accessing the data structure, that the first route for routing data from the satellite to the particular destination has been impacted by a problem; and
in response to determining that the first route for routing data from the satellite to the particular destination has been impacted by a problem, select a second route for routing data from the satellite to the particular destination from the different routes for routing data from the satellite to the destination defined in the data structure.

15. The component of claim 14, wherein the logic elements are further configured to initiate the transmission of the data along the second route.

16. The component of claim 15, wherein:
the definition of the second route for routing data from the satellite to the destination that is stored in the data structure identifies a second satellite as the next node in the satellite communications network along the second route from the satellite to the destination; and
the logic elements are configured to initiate the transmission of the data along the second route by transmitting the data from the satellite across one of the plurality of satellite-to-satellite communication links to the second satellite.

17. The component of claim 14, wherein each data packet belongs to one of multiple different Quality-of-Service classes and wherein the logic elements are configured to determine whether to reroute said data packet along the second route based at least in part on the Quality-of-Service class to which said data packet belongs.

18. The component of claim 14, wherein the logic elements are configured to receive the indication of the problem according to a flooding algorithm.

19. The component of claim 14, wherein said satellites move along a plurality of low earth orbit polar orbits.

\* \* \* \* \*